Patented Aug. 27, 1940

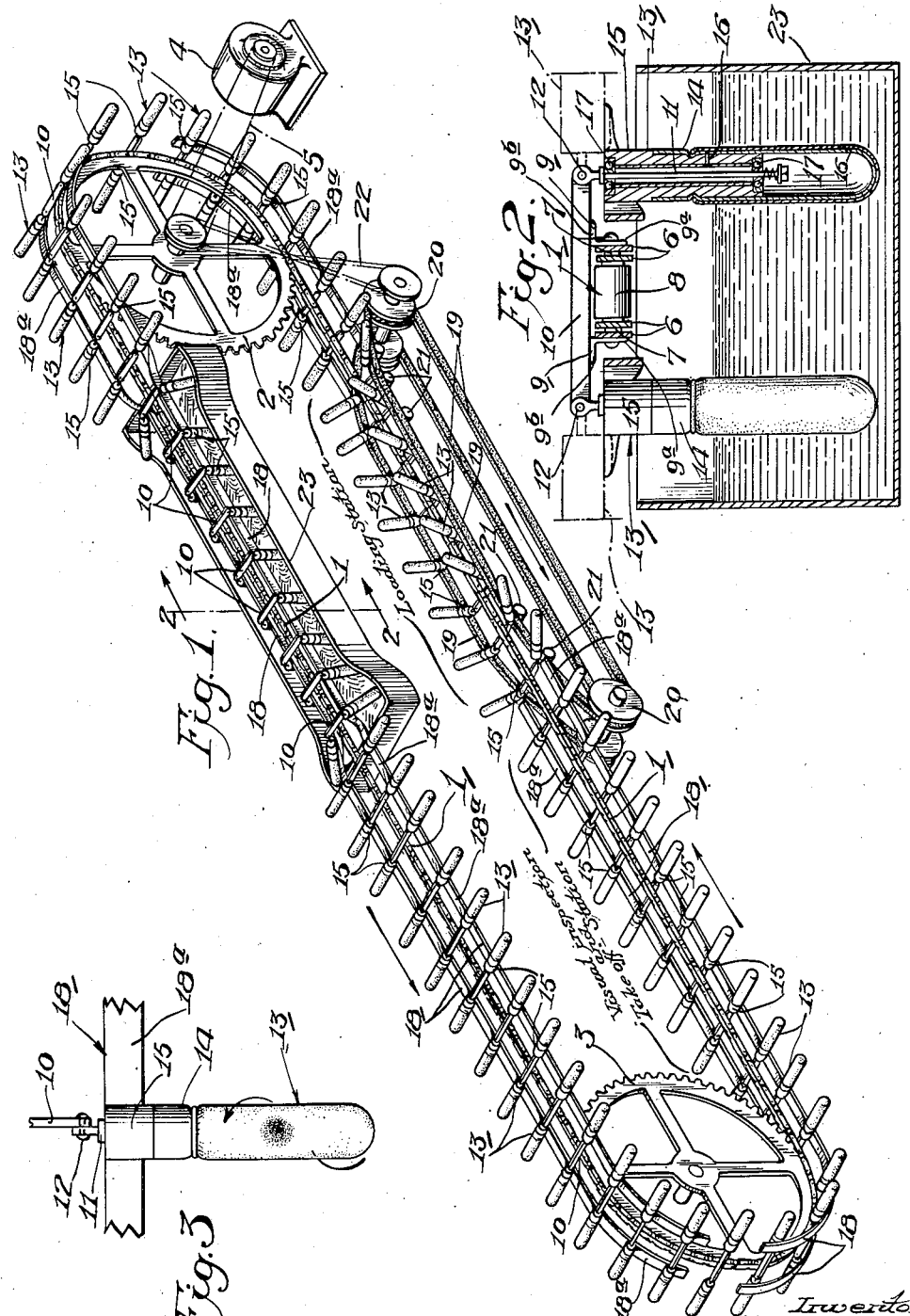

2,213,113

UNITED STATES PATENT OFFICE 2,213,113

METHOD FOR TESTING THIN RUBBER ARTICLES

Arthur M. Youngs, Trenton, N. J., assignor to Youngs Rubber Corp. of N. J., Trenton, N. J., a corporation of New Jersey Original application March 30, 1939, Serial No. 265,018. Divided and this application October 10, 1939, Serial No. 298,852

6 Claims. (Cl. 73—51)

This invention relates to new and useful improvements in methods for testing thin rubber articles and more particularly for testing such articles for imperfections, such as holes and perforations therein, being a division of an application for United States Letters Patent Serial No. 265,018, filed March 30, 1939.

Concurrently with the drive on the part of government and various sociologic associations against venereal diseases, attempts are being made on the part of manufacturers to control the manufacture of rubber prophylactic articles and prevent the sale of such articles as may be defective or imperfect due to the presence of holes or perforations therein.

With the foregoing in mind, the principal object of the present invention is to provide a novel and positive method for testing rubber prophylactic articles whereby any hole or perforation therein, however small, may be readily observed or detected, thus permitting imperfect articles to be rejected.

A still further object of the invention is to provide a method for testing articles of the type described which is entirely arcurate and foolproof.

These and other objects of the invention and the various features thereof are hereinafter fully set forth and shown in the accompanying drawing, in which:

Figure 1 is a semi-diagrammatic view in perspective of one apparatus capable of carrying out the method of the present invention for testing thin rubber articles.

Figure 2 is an enlarged transverse view in section on line 2—2 through the upper run of the apparatus at the point of test; and Figure 3 is a view showing the manner in which the present invention operates to afford visible detection of imperfections in the articles.

The present invention is based essentially upon the discovery that by stretching prophylactic articles of thin rubber over a mandrel or other supporting form and then immersing the same in a bath of liquid, the said liquid will pass through even the most minute hole or perforation in the article and spread over the interior surface thereof between said article and mandrel producing a comparatively dark spot or area which is readily perceptible to the human eye.

Referring now to the drawing, there is there illustrated one form of apparatus capable of carrying out the present method and, referring particularly to Figure 1 thereof, reference numeral 1 designates generally an endless conveyor of the chain type carried upon sprocket wheels 2 and 3, movement of the chain conveyor being continuous and in the direction of the arrows. The sprocket wheel 3 is merely an idler and the chain 1 is driven by the sprocket 2 which is in turn driven from a motor 4 through a suitable belt, chain or the like 5.

The chain conveyor 1 is of the conventional articulated link type comprising pairs of side bars or links 6 pivotally connected to the adjacent or next pair of bars or links 6 by means of a pin 7 which also carries a roller 8, interposed between said side bars or links 6, for engagement with the teeth of the sprocket wheels 2 and 3 in the usual manner. Rigidly secured to the pivot pins 7 at opposite ends thereof are brackets 9 having a vertical leg 9a and an upper outwardly projecting horizontal leg 9b. A bar or rod 10 is secured to the horizontal legs 9b of each pair of brackets 9 so as to extend transversely of the chain conveyor 1 and beyond each side thereof.

Pivotally connected to opposite ends of each cross bar 10 by means of a spindle 11 as at 12 for swinging movement in a plane perpendicular to the plane of travel of the chain 1 is a mandrel or like support, designated generally as 13, for the thin rubber articles. As herein shown, the mandrels 13 comprise a body portion 14 of suitable material, such as metal, and a base or hub portion 15 of suitable material, such as rubber, micarta, Bakelite, or the like. The shape of the main body portion 14 of the mandrel or support 13 conforms susbtantially to that of the rubber articles but is of greater diameter and length than the normal diameter and length of said articles so that the latter are supported thereon in a relatively stretched state or condition, and said body is pressed or otherwise secured upon the adjacent end portion of the base or hub 15.

The body 14 is provided with one or more apertures 16 therein to permit air to pass therethrough from the interior of the articles when mounting the same thereon thus enabling said articles to snugly embrace the bodies without the entrapment of air therebetween and in order that the thin rubber articles will be retained uniformly upon the mandrels 13 in the desired state or degree of stretch said body portions 14 are each provided with a circumferential groove toward or adjacent the base end thereof. This groove is intended to receive the usual bead provided at the open end of the rubber articles which are thus securely retained uniformly upon the mandrels and in the stretched state or condition required successfully to carry out the invention.

The base or hub portion 15 of the mandrel or support 13 is in the form of a relatively thick sleeve or tube and is journalled upon the pivotally mounted spindle 11 by means of suitable ball bearing structures 17 so as to permit rotation of the mandrels freely about said spindles. Thus the mandrel 13, including its main body and base portions 14 and 15, is free to rotate about the spindle 11, and at the same time, by virtue of the pivotal connection 12 of the spindle 11 with the bar 10, is movable in a plane perpendicular to the plane of travel of the chain 1.

The several mandrels 13 are supported in the desired angular position laterally of the chain 1 by means of tracks or guides 18 disposed at either side thereof and in subjacent contact with the hub or base portion 15 of said mandrels, the tracks or guides 18 being stationary and having a friction surface 18a so that the mandrels 13 are caused to roll therealong and rotate about their supporting spindles 11 as they are advanced by the chain 1.

The tracks or guides 18 extend throughout the cycle or course of the chain 1 except for a relatively short length thereof in which the thin rubber articles are respectively mounted upon the mandrels 13 and subsequently removed therefrom, this station being located toward one end of the lower run of the course of the said chain 1. The tracks or guides 18 are so positioned with respect to the chain 1 that their upper surfaces 18a support the mandrels 13 in a substantially horizontal position throughout the greater part of the chain course.

The thin rubber articles are manually stretched upon the mandrels, as hereinbefore described, during the course of travel of the chain 1 near the end of its lower run and at this loading station the hubs or bases 15 of the mandrels 13 leave the stationary tracks or guides 18 and are engaged by an endless belt 19. This belt 19 is carried upon main and auxiliary rolls 20 and 21 respectively so as to elevate the upper course of said belt 19 above the level of the track or guides 18 and thereby elevate or incline the mandrels 13 upwardly at an angle of approximately 45° to facilitate mounting of the thin rubber articles thereon. Mounting of the articles upon the mandrels 13 which rotate about their supporting spindles 11 is extremely difficult and in order to prevent such rotation of said mandrels 13 during this loading stage, the belt 19 is driven in the direction of travel of the chain 1 and at exactly the same speed as said chain so that no rotation of the mandrels takes place while in contact with said belt 19, and to insure exact coordination and duplication of the speed of the chain 1 and belt 19, the latter is driven from the driving means of the former through a chain, belt or the like 22.

Upon leaving the belt 19, the mandrels 13, each with an article mounted thereon, engage the tracks or guides 18 and are supported thereby in a laterally projecting horizontal position in which position they are carried by the chain 1 about the sprocket wheels 2 into the upper run of the course where they traverse an open trough or tank 23 of suitable length and width. In this portion of the upper run over the tank 23 the tracks or guides 18 converge gradually into closer spaced relation with respect to the chain 1 and their upper mandrel contacting surfaces 18a gradually decline outwardly and downwardly until they are disposed in a substantially vertical plane, thus permitting the said mandrels 13 to swing downwardly into the trough or tank 23 as shown in Figures 1 and 2 of the drawing. After the mandrels 13 have moved through the trough or tank a relatively short distance in the substantially vertical position shown in said Figure 2, the tracks or guides 18 and their upper surfaces gradually return to their previous relative positions thus causing the mandrels 3 to be gradually raised or swung upwardly out of said trough or tank 23 into horizontal position again for continued movement through the course.

The trough or tank 23 is filled with a suitable liquid such as, for example, water, and upon immersion of the articles therein as above described, the liquid will penetrate through even the smallest hole in an article and appear as a relatively dark, readily visible area in the region of said hole. In its normal condition the liquid, for example water, requires a period of time to penetrate the smaller holes which is of too great duration for practical commercial application of the invention for quantity production work and, in order that the water will penetrate even the smallest hole in an article in a few seconds time, I reduce the surface tension of the liquid to the desired extent or degree. This may be done by heating the liquid or adding thereto a predetermined quantity of a wetting agent such as, for example, "Aerosol." In the practical commercial application of the invention, however, I both heat the water and also add thereto a small quantity of "Aerosol;" and very satisfactory results are obtained by the use of a bath of water maintained at a temperature between approximately 100° F. to 110° F. and to which has been added a ten per cent solution of "Aerosol" at the rate of one ounce for each gallon of water.

The bath is preferably of such depth and so spaced below the chain 1 that as the mandrels 13 swing downwardly into the same, in the manner previously described, the articles mounted thereon are substantially entirely immersed in said liquid for a predetermined though comparatively short period of time and travel as shown in Figure 2 of the drawing.

During immersion and travel of the articles through the bath should any article be imperfect the liquid will pass or seep through the most minute hole or aperture in the article and spread out over the inner surface thereof between said article and its supporting mandrel and around such hole or perforation thus producing a comparatively darker spot or area, for example, as shown in Figure 3, which is readily perceptible to the eye, and enabling an observer or inspector to discard that particular article because defective.

While a particular embodiment of the invention has been herein illustrated and described it is not intended that said invention be limited thereto but that changes and modifications may be made and incorporated therein within the scope of the annexed claims.

I claim:

1. The method of testing thin rubber articles to detect imperfections therein, such as holes, which consists in mounting an article upon a body arranged to support the same in a comparatively stretched condition, and then immersing said article thus mounted in a liquid bath for a predetermined period of time so that said liquid will pass through any hole in the article and spread over the underlying supporting surface of the body producing a comparatively dark area which is readily visible through said article.

2. The method of testing thin rubber articles to detect imperfections therein, such as holes, which consists in mounting an article upon a body arranged to support the same in a comparatively stretched condition, and then immersing said article thus mounted in a liquid bath for a predetermined period of time, said bath being heated to a predetermined temperature to substantially reduce the surface tension thereof so that the liquid will pass quickly through any hole in the article and spread over the underlying supporting surface of the body producing a comparatively darker area which is readily visible through said article.

3. The method of testing thin rubber articles to detect imperfections therein, such as holes, which consists in mounting an article upon a body arranged to support the same in a comparatively stretched condition, and then immersing said article thus mounted in a liquid bath for a predetermined period of time, said liquid bath having a predetermined quantity of a wetting agent added thereto to substantially lower its surface tension so that the liquid will pass quickly through any hole in the article and spread over the underlying supporting surface of the body producing a comparatively darker area which is readily visible through said article.

4. The method of testing thin rubber articles to detect imperfections therein, such as holes, which consists in supporting a series of said articles in a relatively stretched condition, advancing said series of supported articles through a predetermined path of travel and immersing said supported articles in a liquid bath for a predetermined portion of said travel so that said liquid will pass through any hole in the article and spread over the underlying supporting surface of the body producing a comparatively dark area which is readily visible through said article.

5. The method of testing thin rubber articles to detect imperfections therein, such as holes, which consists in supporting a series of said articles in a relatively stretched condition, advancing said series of supported articles through a predetermined path of travel and immersing said supported articles in a liquid bath for a predetermined portion of said travel, said bath being heated to a predetermined temperature to substantially reduce the surface tension thereof so that the liquid will pass quickly through any hole in the article and spread over the underlying supporting surface of the body producing a comparatively darker area which is readily visible through said article.

6. The method of testing thin rubber articles to detect imperfections therein, such as holes, which consists in supporting a series of said articles in a relatively stretched condition, advancing said series of supported articles through a predetermined path of travel and immersing said supported articles in a liquid bath for a predetermined portion of said travel, said liquid bath having a predetermined quantity of a wetting agent added thereto to substantially lower its surface tension so that the liquid will pass quickly through any hole in the article and spread over the underlying supporting surface of the body producing a comparatively darker area which is readily visible through said article.

ARTHUR M. YOUNGS.